June 21, 1927.

D. W. PERRY 1,633,417

EYEGLASS CASE HOLDING AND PROTECTING DEVICE

Filed Dec. 2, 1926    2 Sheets-Sheet 1

WITNESSES

INVENTOR
DYER W. PERRY
BY
ATTORNEY

June 21, 1927.
D. W. PERRY
1,633,417
EYEGLASS CASE HOLDING AND PROTECTING DEVICE
Filed Dec. 2, 1926
2 Sheets-Sheet 2
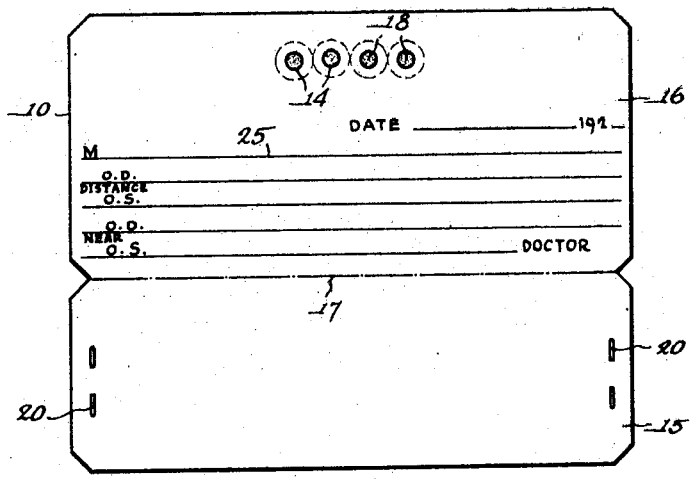
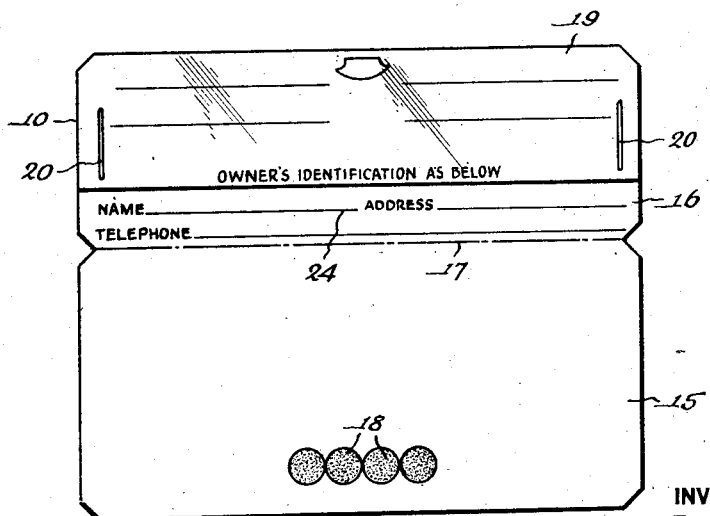
INVENTOR
DYER W. PERRY
BY
ATTORNEY Patented June 21, 1927.

1,633,417

UNITED STATES PATENT OFFICE.

DYER W. PERRY, OF KEENE, NEW HAMPSHIRE.

EYEGLASS-CASE HOLDING AND PROTECTING DEVICE.

Application filed December 2, 1926. Serial No. 152,198.

This invention relates to devices adapted to be arranged within an eyeglass or spectacle case, which obviates scratching of the lenses of the eyeglass or spectacle, which obviates possible breaking of the lenses, which retains a cleaning cloth in flat condition protected from grit or other foreign matter apt to cause scratches on the eyeglass or spectacle lenses in the cleaning operation, which provides for personal identification, and which affords space for an optometrist's prescription.

More specifically, an object of the invention, is to provide a device in the form of a folder, adapted to be inserted in an eyeglass or spectacle case, and having means for effecting the attachment of the folder, and means having a highly polished or glazed surface adapted to be contacted by the lenses of the eyeglass or spectacles to obviate scratching of the lenses, and including a flap beneath which may be arranged a cleaning cloth, which with said flap acts as a cushion for the lenses of the eyeglass and thus prevents possible breakage of the lenses when subjected to jolts or jars.

The nature of the invention and its distinguishing features and advantages will appear when the following specification is read in connection with the accompanying drawing, in which—

Fig. 3 is an elevation of the folder, the flaps being disposed in non-folded condition.

Fig. 4 is a view similar to Fig. 3, but showing the opposite side of the folder.

Figure 1:
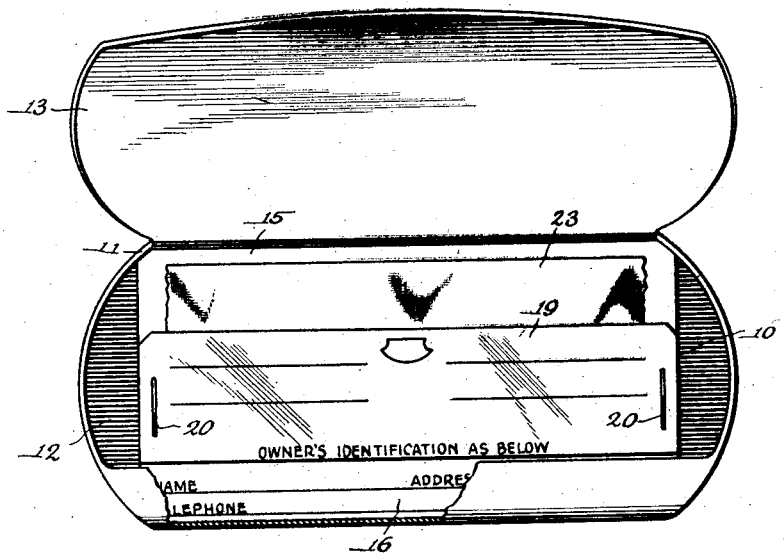
Figure 1 is an elevation of an open eyeglass case with a portion thereof broken away, and showing the device of the present invention arranged therein.
Figure 2:
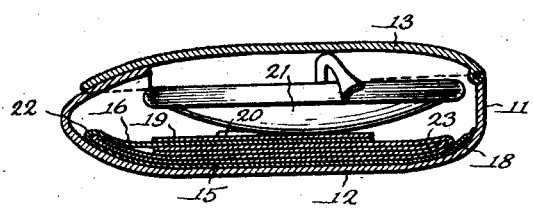
Fig. 2 is a transverse sectional view through the closed eyeglass case, also the device of the present invention, and illustrating the manner in which an eyeglass may be arranged in a protected condition.

The device 10 illustrated in the drawings, is by way of example only of the several features of the present invention, and may advantageously be in the form of a folder to fit any size eyeglass or spectacle case inside of which it will be arranged. In Figs. 1 and 2 of the drawing there is shown the usual type of eyeglass or spectacle case 11 having a receptacle section 12, and a spring actuated section 13 which serves as a cover for the section 12. This type of case is lined with velvet or similar material. It has been found that grit and other foreign matter adheres to such a lining which causes detrimental scratches to the lenses of the eyeglass. This type of eyeglass case also lacks the necessary means for cushioning the eyeglass arranged within the same so that when the case is subjected to a jolt or jar as the result of being dropped, for instance, the lenses break.

The device 10 overcomes the disadvantages mentioned and affords other advantages which will appear. The device 10, in the present instance, is made from foldable material such as stout paper, or cardboard, or any other preferred material. The material is cut and formed to provide holes 14 for a purpose to appear, and flaps 15 and 16. The flap 16 is smaller in width, than the width of the flap 15 but is of the same length, and is adapted to be folded over the flap 15 on the fold line indicated at 17. Pads or disks of felt 18 are provided. Each of the pads 18 is impregnated with an adhesive substance having a pleasant odor. One pad 18 is associated with each of the holes 14. Each pad 18 is pressed in sticking contact with the back side of the flap 15 and a portion thereof enters the related hole 14. The pads 18 are thus carried by the flap 15 by moistening the pads, and by virtue of the adhesive substance embodied thereby, the folder may be attached to the inside of the receptacle section 12 of the case. The folder will be positioned as shown in Fig. 1, with the flap 16 uppermost.

In order to provide means which presents a smooth or highly polished surface to obviate scratching of the lenses of the eyeglass or spectacle to be arranged in the case, there is provided in the present instance a celluloid strip 19. The strip 19 is arranged over the upper face of the flap 16 and is secured thereto by suitable fasteners 20, there being one at one end of the strip 19. The strip 19 is as long as the flap 16 but is of less width. The lenses of the eyeglass or spectacle indicated at 21 are adapted to rest in contact with the strip 19, as shown most clearly in Fig. 2, and this obviates detrimental scratching of the lenses. It will at once be obvious that clear vision through the lenses of the eyeglass will always be preserved.

The flap 16 is adapted to be moved with respect to the flap 15. The fold portion 22 serves as a hinge and allows the flap 16 to be moved toward and over the flap 15, and to be moved away from the flap 15. Under such provision, it is possible to arrange a cleaning cloth such as the one indicated at 23 between the flaps 15 and 16. The cleaning cloth will be held nicely folded in a flat or non-wrinkled condition, thus preserving the natural condition of the cleaner to the end that the cleaner will not present any harsh surfaces apt to scratch or mar the lenses in the cleaning operation. It is also to be understood that the cleaner 23 as held beneath the flap 16 will serve as a cushioning means to effectually prevent possible breakage of the lenses of the eyeglass.

The device 10 will embody owner's identification through and by virtue of suitable indicia indicated at 24 which will be printed on one face of the flap 16. The flap may also have printed thereon other instructive information, or an advertisement which will appear beneath the strip 19, the latter being transparent in such case and will serve to protect the indicia against obliteration. The opposite side of the device may also contain any desired printed matter such as an optometrist's or doctor's prescription; indices appropriate for such information, being indicated at 25.

From the foregoing it will be apparent that there has been described a device adapted to be inserted in an eyeglass or spectacle case which obviates scratching and breaking of the lenses of the eyeglass, which provides means for adequately holding a cleaning cloth in proper condition and conveniently accessible, and which embodies means for easily attaching a device within the case also having the character of exuding pleasant odors within the case.

I claim:

1. The combination with an eyeglass case, of means within the case having a glazed surface on which the lenses of the eyeglass may rest, and cushioning means acting in conjunction with the first mentioned means.

2. The combination with an eyeglass case, of a folder secured in place inside of said case, said folder including a movable flap adapted to receive therebeneath a cleaning cloth, and a celluloid strip attached to the upper face of said flap.

3. A device for an eyeglass case, including means for effecting the attachment of the device to the inside of the case, and a movable glazed lens supporting flap connected with said means.

4. A device for an eyeglass case, including pads impregnated with adhesive matter adapted to be moistened for effecting the attachment of the device to the inside of the case, and a movable glazed lens supporting flap connected with said pads.

5. A folder for an eyeglass case comprising two flaps on a longitudinal fold portion, one flap of less width than the other and movable with respect thereto, means on one flap for effecting the attachment of the folder, and glazed means on the outside of the other flap.

DYER W. PERRY.